Nov. 5, 1968

R. J. MILLER 3,409,035

VALVE ASSEMBLY WITH RESILIENT ENCAPSULATING NOSE
PORTION AND WALL SCRAPING MEANS

Filed April 19, 1966

INVENTOR
Raymond J. Miller
BY
Dressler, Goldsmith, Clement & Gordon
ATTORNEYS

Nov. 5, 1968 R. J. MILLER 3,409,035
VALVE ASSEMBLY WITH RESILIENT ENCAPSULATING NOSE
PORTION AND WALL SCRAPING MEANS
Filed April 19, 1966 2 Sheets-Sheet 2

INVENTOR
Raymond J. Miller
BY
Dressler, Goldsmith, Clement & Gordon
ATTORNEYS

United States Patent Office 3,409,035
Patented Nov. 5, 1968

3,409,035
VALVE ASSEMBLY WITH RESILIENT ENCAPSULATING NOSE PORTION AND WALL SCRAPING MEANS
Raymond J. Miller, Racine, Wis., assignor to J. I. Case Company, a corporation of Wisconsin
Filed Apr. 19, 1966, Ser. No. 543,690
7 Claims. (Cl. 137—242)

ABSTRACT OF THE DISCLOSURE

A plug valve assembly comprising a resilient nose member detachably secured to a valve body so that it may be replaced when it becomes worn. The nose member is adapted to be moved transversely into a pipe through which concrete flows. The resiliency of the nose member allows it to encapsulate concrete particles trapped between it and the inner wall surface of the pipe. The nose member has a fluid-filled chamber to facilitate recovery of its initial shape when it is moved out of sealing engagement with the inner wall surface of the pipe. The valve body has scraping means associated with it to scrape the inner wall surface of the housing clean as the valve is moved in the housing.

---

This invention relates to a plug valve assembly and is particularly concerned with a valve assembly having a deformable resilient nose member adapted to encapsulate solids trapped between it and the surface with which it is in sealing engagement.

Heretofore, plug valves having resilient nose members for engaging the surface of a flow passageway to seal it against the flow of concrete have not been entirely satisfactory for several reasons. If rough aggregate is caught between the nose member and the surface to be sealed, the stresses are localized at each point of contact with such aggregate. The wear on the nose member is excessive and shortens the useful life of the nose member. Furthermore, if several pieces of aggregate are caught between the nose member and the surface to be sealed, the nose member may not seal the flow passageway effectively.

In accordance with the present invention, the nose member is detachably secured to the valve body so that it may be readily replaced when it becomes worn, and has a fluid filled chamber that facilitates recovery of the initial shape of the nose member when it is moved out of sealing engagement. This novel design also reduces the unit stress on the nose when it engages solids trapped between it and the sealed surface when the valve assembly is moved into sealing engagement with the inner surface of a flow passageway, such as, for example, a pipe through which material, such as concrete, for example, flows.

Suitable structure by means of which the above mentioned and other advantages of the invention are attained will be described in the following specification, taken in conjunction with the accompanying drawings showing a preferred embodiment of the invention, in which.

Figure 1:
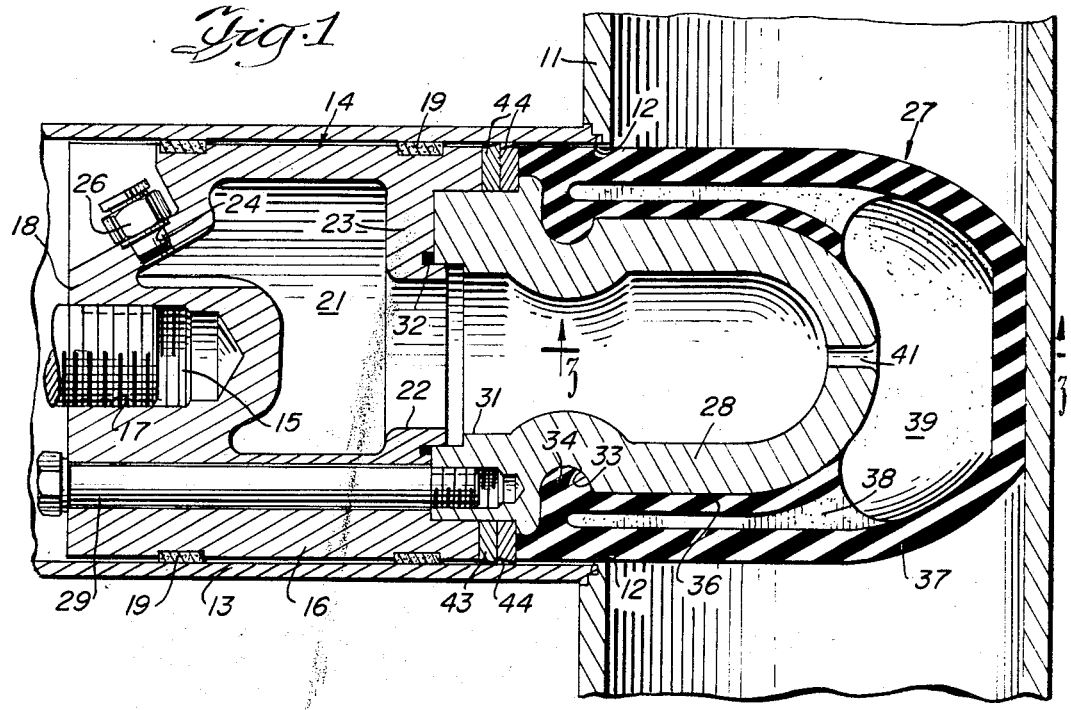
FIGURE 1 is a sectional view showing a plug valve assembly in sealing engagement with the inner wall surface of a pipe.

In the drawings, a tubular pipe 11, through which concrete is pumped, has an opening 12 in one wall in which there is secured in any suitable manner a tubular valve housing 13. A plug valve assembly 14 is slidably mounted within the housing 13, which assembly is moved into and out of sealing engagement with the inner wall surface of the pipe 11 by a piston rod 15.

The valve assembly 14 has a valve body 16 secured to the end of the piston rod 15 in any suitable manner as for example, by means of a threaded interengagement with a threaded recess 17 located in one end wall 18 of the valve body. A plurality of sealing rings 19 are mounted on the outer surface of the valve body to provide a sliding frictional fit with the housing 13. The valve body 16 is hollow, as indicated at 21, and has an aperture 22 in its opposite end wall 23. The end wall 18 has a threaded aperture 24 for receiving a filling valve 26.

In accordance with the present invention, the valve assembly has a resilient nose member 27 projecting from one end of the valve body 16 for sealing engagement with the inner surface of a flow passageway, such as the pipe 11. The nose member is made of any suitable rubber or plastic composition, and is deformable so that it encapsulates aggregate that may be caught between it and the inner surface of the pipe when it is pressed into engagement therewith. The nose member may be secured directly to the valve body, but preferably is secured to a nose core 28 that is secured to the valve body in any suitable manner, as, for example, by a plurality of bolts 29. The nose core may be of any desired configuration, but is shown as being in the shape of a hollow dome having an open end 31 that communicates with the opening 22. The joint between the nose core and the valve body may be sealed with an O-ring 32. The nose member 27 may be secured to the nose core 28 in any suitable manner. One means for securing the nose member comprises an interengageable annular recess 33 and annular projection 34 fitting snugly in the recess.

The nose member 27 comprises an inner wall 36, an outer wall 37, and a plurality of thin web members 38 interconnecting the walls 36 and 37. The inner wall 36 and the web member 38 terminate short of the closed end of the outer wall 37 which cooperates with the corersponding end of the nose core to form a fluid receiving chamber 39. An aperture 41 extends through the domed wall of the nose core to complete the fluid passageway from the filling valve 26 to the chamber 39. When the chamber 39 is filled and the filling valve 25 is closed, the fluid filled chamber acts as a resilient cushion.

The fluid filled chamber 39 reduces the unit stress on the nose material when it encapsulates aggregate between it and the inner wall surface of the pipe 11, and thereby minimizes the wear on the valve assembly. When the nose becomes worn so that it no longer forms an effective seal with the inner wall surface of the pipe 11, the bolts 29 permit the nose to be easily removed and replaced.

In the drawings, the filling valve is shown as being secured in the end wall 18 of the valve housing. In this position, the filling valve is accessible, and the fluid receiving chamber 39 may be filled at any time. If desired, the filling valve may be secured directly to the nose core, but in such case the chamber 39 must be filled before the valve body and nose are assembled, and it is necessary to disassemble the plug valve assembly to recharge the valve.

Figure 2:
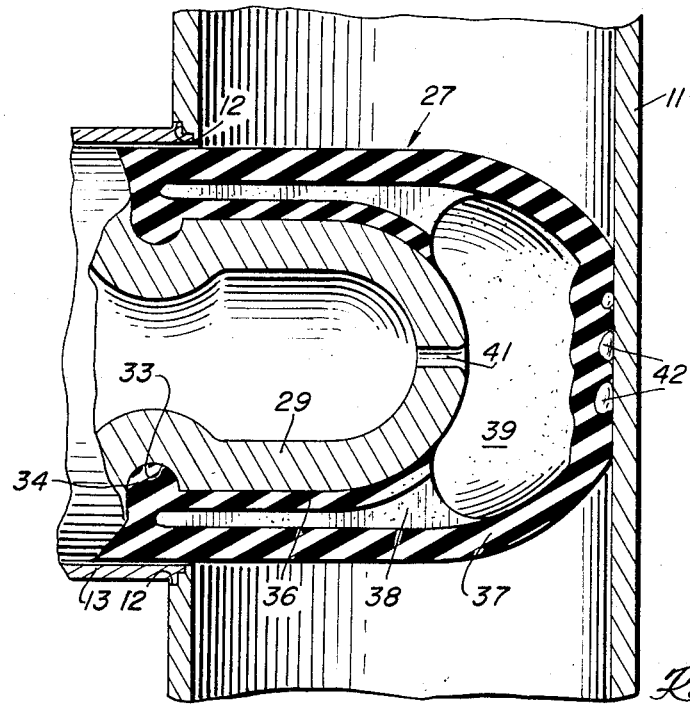
FIGURE 2 is a fragmentary view, partly in section and partly in elevation showing the nose of FIGURE 1 with aggregate trapped between the nose and the inner wall surface of the pipe.
Figure 4:
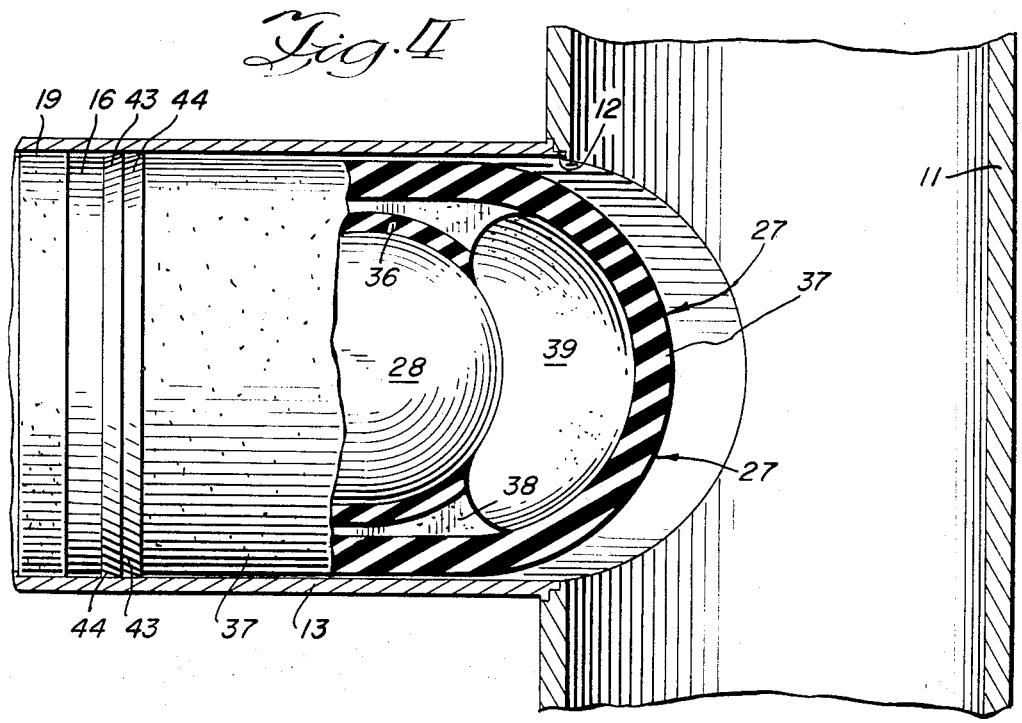
FIGURE 4 is a fragmentary view, partly in section and partly in elevation, showing the plug valve assembly in its retracted position.
Figure 3:
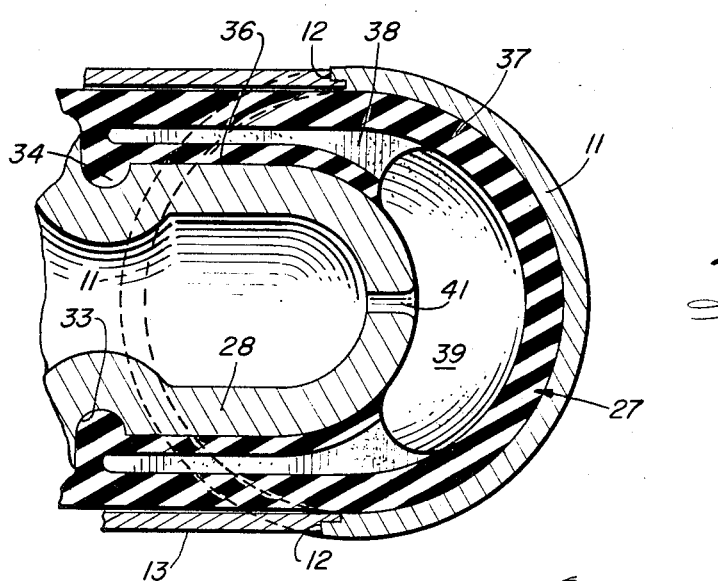
FIGURE 3 is a sectional view, taken along the line 3–3 of FIGURE 1.

In operation, the piston rod 15 is actuated to move the valve assembly toward the right, as viewed in FIGURE 1, until the closed end of nose member 27 is pressed into sealing engagement with the inner wall surface of the pipe 11. If any aggregate, such as that indicated at 42 in FIGURE 2, is trapped between the outer wall 37 of the nose member and the inner wall surface of the pipe 11, the wall 37 is deformed to encapsulate the aggregate, and forms an effective seal that stops the flow of concrete through the pipe 11.

When the valve assembly is retracted and the nose member 27 is moved out of engagement with the inner wall surface of the pipe 11, the resilience of the nose member will cause it to resume its initial shape. The fluid filled chamber 39 facilitates the recovery of the initial shape of the nose member.

If aggregate sticks to the nose wall 37, the nose member 27 may carry some of the concrete mix into the valve housing 13 when the valve assembly is retracted. Although the amount of concrete mix that can enter the valve housing is relatively small, it would impair the reciprocation of the valve assembly in the housing. In order to eliminate this possibility, one or more annular washers 43 are secured between the end of the valve housing and the adjacent end of the nose member. The peripheral edge 44 of each washer is tapered, with the widest portion closest to the outer end of the valve housing 13. The peripheral edges of the washers 43 engage the inner wall surface of the valve housing 13 when the nose member is moved into sealing engagement with the pipe 11, to scrape out any of the concrete mix that might be carried into the valve housing by the nose member 27, and keep the inner wall surface of the valve housing clean.

Although a preferred embodiment of the invention has been described in considerable detail, it will be understood that the description thereof is intended to be illustrative, rather than restrictive, as many details of structure may be modified or changed, without departing from the spirit or scope of the invention. Accordingly, it is not desired to be restricted to the exact structure disclosed.

What is claimed is:

1. A plug valve assembly comprising a valve body, a nose core connected to said valve body, a resilient nose member connected to said nose core and adapted to be pressed into sealing engagement with a surface of a flow passageway to seal said passageway, said nose member cooperating with said nose core to define a chamber filled with fluid, whereby the nose member is deformable to encapsulate material trapped between it and said flow passageway, and the initial shape of said nose member will be restored when it is moved out of sealing engagement with said surface.

2. A plug valve assembly as recited in claim 1 and having a fluid passageway in flow communication with said fluid receiving chamber and a filling valve at one end of said fluid passageway to facilitate filling said chamber with fluid.

3. A plug valve assembly as recited in claim 1, said assembly including a housing in which said valve body is slidably mounted, and scraping means associated with said valve body, said scraping means projecting laterally beyond the outer surface of said valve body and being engageable with the inner wall surface of said housing to clean it as said valve body is moved relative thereto.

4. A plug valve assembly as recited in claim 1 in which said nose core is detachably secured to said valve body and said nose member and nose core are secured together by an interengaging recess and projection.

5. A plug valve assembly as recited in claim 4 in which said valve body defines a fluid passageway in flow communication with said fluid receiving chamber, and means permitting said chamber to be filled with fluid.

6. A plug valve assembly as recited in claim 1, said assembly having a housing in which said valve body is slidably mounted, means for reciprocating said valve body in said housing, and a plurality of annular washers surrounding said nose core and having their peripheral edges tapered with the widest portion of each closest to the outer end of said housing and engaging the inner wall surface of said housing to clean it as said valve body is reciprocated in said housing.

7. A plug valve assembly as recited in claim 1, said assembly including a tubular housing in which said valve body is slidably mounted, said housing extending at an angle to said flow passageway and having an open end communicating with an opening in one side of said flow passageway, whereby said resilient nose member is movable transversely through said flow passageway into sealing engagement with the inner surface of said flow passageway opposite said opening.

References Cited
UNITED STATES PATENTS

| | | | |
|---|---|---|---|
| 2,213,998 | 9/1940 | Sifkovitz | 137—242 |
| 2,470,744 | 5/1949 | Korn. | |
| 2,913,012 | 11/1959 | McCurley | 138—94 |
| 2,964,289 | 12/1960 | Schmitz | 251—187 X |
| 3,043,555 | 7/1962 | Breher | 251—187 |
| 3,315,696 | 4/1967 | Hunter | 137—242 X |
| 3,348,566 | 10/1967 | Varis | 137—242 |

CLARENCE R. GORDON, *Primary Examiner.*